United States Patent
Gage et al.

(10) Patent No.: US 7,215,928 B2
(45) Date of Patent: May 8, 2007

(54) PATH SELECTION IN WIRELESS NETWORKS

(75) Inventors: William Gage, Stittsville (CA); Biswaroop Mukherjee, Ottawa (CA)

(73) Assignee: Nortel Networks Limited, St. Laurent, Quebec (CA)

(*) Notice: Subject to any disclaimer, the term of this patent is extended or adjusted under 35 U.S.C. 154(b) by 586 days.

(21) Appl. No.: 10/682,087

(22) Filed: Oct. 10, 2003

(65) Prior Publication Data

US 2004/0219922 A1 Nov. 4, 2004

Related U.S. Application Data

(60) Provisional application No. 60/467,432, filed on May 2, 2003.

(51) Int. Cl.
*H04B 1/00* (2006.01)
*H04B 15/00* (2006.01)

(52) U.S. Cl. .......... 455/63.1; 455/522; 455/67.13; 370/238; 370/252; 370/337; 370/349; 714/704; 714/748; 379/229; 379/56.2

(58) Field of Classification Search ........ 455/63.1, 455/522; 370/238, 252, 337, 349; 714/748, 714/704
See application file for complete search history.

(56) References Cited

U.S. PATENT DOCUMENTS 6,011,780 A * 1/2000 Vaman et al. ............ 370/237
6,570,851 B1 * 5/2003 Koskelainen et al. ....... 370/231
6,842,430 B1 * 1/2005 Melnik .................... 370/254
6,947,733 B2 * 9/2005 Tillotson ................. 455/423
6,958,986 B2 * 10/2005 Cain ...................... 370/337
6,961,310 B2 * 11/2005 Cain ...................... 370/238
6,973,039 B2 * 12/2005 Redi et al. ............... 370/238
7,058,018 B1 * 6/2006 Hasty et al. ............. 370/250
2002/0042274 A1   4/2002 Ades ...................... 455/445
2002/0172186 A1   11/2002 Larsson .................. 370/349
2003/0161268 A1   8/2003 Larsson et al. ........... 370/229

FOREIGN PATENT DOCUMENTS

WO    0241521    5/2002

OTHER PUBLICATIONS

Apostolopoulos, G.; Williams, D.; Kamat, S.; Guerin, R.; Orda, A.; Przygienda, T.; QoS Routing Mechanisms and OSPF Extensions; Networking Group, Request for Comments: 2676; Category: Experimental; Aug. 1999; pp. 1-50.

* cited by examiner

*Primary Examiner*—Marceau Milord

(57) ABSTRACT

In a wireless network, a lowest cost path from a source node to a target node is selected from a plurality of potential paths. The source node sums costs for the links of each potential path. For each link, these costs include a cost of interference, dependent on a number of nodes affected by a signal sent via the respective link. The link costs can also include a cost of transmission, dependent upon a data rate for the respective link, and a cost of coordination for transmissions with other nodes of the network.

20 Claims, 1 Drawing Sheet

PATH SELECTION IN WIRELESS NETWORKS

CROSS-REFERENCE TO RELATED APPLICATIONS

This application claims the benefit of U.S. Provisional Application No. 60/467,432 filed May 2, 2003, the entire contents and disclosure of which are hereby incorporated herein by reference.

This patent application is related to the following Provisional patent applications filed in the U.S. Patent and Trademark Office, the disclosures of which are expressly incorporated herein by reference:

U.S. Patent Application Ser. No. 60/446,617 filed on Feb. 11, 2003 and entitled "System for Coordination of Multi Beam Transit Radio Links for a Distributed Wireless Access System" [15741]

U.S. Patent Application Ser. No. 60/446,618 filed on Feb. 11, 2003 and entitled "Rendezvous Coordination of Beamed Transit Radio Links for a Distributed Multi-Hop Wireless Access System" [15743]

U.S. Patent Application Ser. No. 60/446,619 filed on Feb. 12, 2003 and entitled "Distributed Multi-Beam Wireless System Capable of Node Discovery, Rediscovery and Interference Mitigation" [15742]

U.S. Patent Application Ser. No. 60/447,527 filed on Feb. 14, 2003 and entitled "Cylindrical Multibeam Planar Antenna Structure and Method of Fabrication" [15907]

U.S. Patent Application Ser. No. 60/447,643 filed on Feb. 14, 2003 and entitled "An Omni-Directional Antenna" [15908]

U.S. Patent Application Ser. No. 60/447,644 filed on Feb. 14, 2003 and entitled "Antenna Diversity" [15913]

U.S. Patent Application Ser. No. 60/447,645 filed on Feb. 14, 2003 and entitled "Wireless Antennas, Networks, Methods, Software, and Services" [15912]

U.S. Patent Application Ser. No. 60/447,646 filed on Feb. 14, 2003 and entitled "Wireless Communication" [15897]

U.S. Patent Application Ser. No. 60/451,897 filed on Mar. 4, 2003 and entitled "Offsetting Patch Antennas on an Omni-Directional Multi-Facetted Array to allow Space for an Interconnection Board" [15958]

U.S. Patent Application Ser. No. 60/453,011 filed on Mar. 7, 2003 and entitled "Method to Enhance Link Range in a Distributed Multi-hop Wireless Network using Self-Configurable Antenna" [15946]

U.S. Patent Application Ser. No. 60/453,840 filed on Mar. 11, 2003 and entitled "Operation and Control of a High Gain Phased Array Antenna in a Distributed Wireless Network" [15950]

U.S. Patent Application Ser. No. 60/454,715 filed on Mar. 15, 2003 and entitled "Directive Antenna System in a Distributed Wireless Network" [15952]

U.S. Patent Application Ser. No. 60/461,344 filed on Apr. 9, 2003 and entitled "Method of Assessing Indoor-Outdoor Location of Wireless Access Node" [15953]

U.S. Patent Application Ser. No. 60/461,579 filed on Apr. 9, 2003 and entitled "Minimisation of Radio Resource Usage in Multi-Hop Networks with Multiple Routings" [15930]

U.S. Patent Application Ser. No. 60/464,844 filed on Apr. 23, 2003 and entitled "Improving IP QoS though Host-Based Constrained Routing in Mobile Environments" [15807]

U.S. Patent Application Ser. No. 60/467,432 filed on May 2, 2003 and entitled "A Method for Path Discovery and Selection in Ad Hoc Wireless Networks" [15951]

U.S. Patent Application Ser. No. 60/468,456 filed on May 7, 2003 and entitled "A Method for the Self-Selection of Radio Frequency Channels to Reduce Co-Channel and Adjacent Channel Interference in a Wireless Distributed Network" [16101]

U.S. Patent Application Ser. No. 60/480,599 filed on Jun. 20, 2003 and entitled "Channel Selection" [16146]

This invention relates to path selection in wireless networks, in which wireless communications can take place via various wireless communication paths among a plurality of distributed wireless communication nodes.

BACKGROUND

To facilitate communications in a wireless system or data network, it is desirable to provide a plurality of wireless access nodes among which communications can take place via wireless links, the nodes optionally communicating via one or more wired connection paths with a wired communications network. In such a wireless network, wireless terminals can communicate with the nodes also via wireless links. For clarity herein, the wireless links via which the wireless terminals communicate with the nodes are referred to as access links, and the wireless links for communications among the nodes are referred to as transit links.

Such a wireless network may be referred to as an ad hoc network, in that wireless nodes can be easily added to or moved within the network to suit particular wireless data communications needs at any particular time. For example, the nodes can be distributed within a geographical region or area within which wireless access services are to be provided, and the wireless terminals can communicate among themselves and/or with the network via the various nodes. The wireless terminals can have any of various forms, and the communicated signals can comprise any desired form of information. Such a wireless system conveniently operates in a packet communications mode.

By way of example, the wireless communications via the access and transit links can be in accordance with known standards, such as the IEEE 802.11 standard for wireless LAN (local area network) communications. Channels in different frequency bands can be used for the access and transit links; for example channels in the 2.4 GHz band (IEEE 802.11b) for the access links and channels in the 5.2 and 5.7 GHz bands (IEEE 802.11a) for the transit links. However, this need not be the case and the access and transit links can use other frequency bands and/or can both use the same frequency band.

On initialization and re-initialization of a node in such a wireless network, for example on power-up, after maintenance, after recovery from an internal fault, or after recovery from a long outage of network communications, the node must discover the identities of its neighbouring nodes in order to initiate wireless communications with them, in order to discover communications or routing paths that the node can use. In contrast to a wired network in which this can be done simply by a node sending a "hello" signal via each of its physical interfaces (wired links), in a wireless network the node may have only one physical interface (a wireless link) via which it may communicate with many other nodes. Accordingly, the discovery process for a wireless node is relatively more complicated.

Other aspects of discovering and selecting a routing path in a wireless network relate to factors such as signal strength or transmitted power level, interference, and, for packet data networks, packet delay.

More particularly, in a wireless network the data rate of a wireless connection between two nodes can be variable and proportional to a power level used by the transmitter of the sending node to send the data; a higher power corresponds to a higher data rate. In a packet data network subjected to unpredictable bursts of traffic, congestion and delay management strategies may rely on using the highest possible data rate.

However, in many wireless networks the overall system communication capacity is limited by the amount of interference that each node in the network encounters. While part of such interference may be from sources external to the wireless network, wireless communications of other nodes within the network are a significant, and often dominant, source of interference. This interference is increased with higher power signals transmitted from the nodes.

In a wired packet data network it may be desirable to use a routing protocol which attempts to minimize packet delay by finding a lowest cost path through the network for any particular packet. Applying the same strategy to a wireless network, a first node would attempt to send a packet (e.g. containing information received by this node from a terminal via an access link) via a transit link to a second node that is the closest node to an intended destination (e.g. another terminal) of the packet. With increasing distances between the two nodes, for example if the terminals are far apart, the first node must use an increasing transmit power level, contributing to increased interference for other nodes in the network.

Accordingly, there are conflicting desires to minimize transmission power levels in order to minimize interference for the nodes of the wireless network, and to maximize transmission power levels in order maximize data rates and to minimize a number of communication hops among the nodes (and hence packet delay) in the wireless network. If a node of the wireless network is not able to make decisions autonomously to resolve this conflict, it must coordinate its transmissions with other nodes in the wireless network. Such coordination introduces communications overhead and further interference, and so there is a further trade-off between the coordination overhead and the benefits of coordination.

It would be desirable to provide a method of selecting a communications path via nodes of a wireless network which facilitates resolving these conflicts.

SUMMARY OF THE INVENTION

According to this invention there is provided a method of selecting a communication path, in a wireless network comprising a plurality of nodes and wireless communication links between the nodes, from a plurality of potential communication paths comprising different combinations of said links from a source node to a target node, comprising the steps of, in the source node: determining for each link in the potential communication paths a cost of interference dependent upon a number of nodes affected by a signal sent via the respective link; determining a total cost for each potential communication path, the total cost being dependent upon combined costs of interference for the links of the respective potential communication path; and selecting as a communication path from the source node to the target node a potential communication path having a lowest total cost.

The method preferably also includes the step of, in the source node, determining for each link in the potential communication paths a cost of transmission dependent upon a data rate for a signal sent via the respective link, wherein the total cost determined for each potential communication path is also dependent upon combined costs of transmission for the links of the respective potential communication path.

The method can also include the step of, in the source node, determining for each link in the potential communication paths a cost of coordination of transmissions on the link with transmissions from other nodes of the network, wherein the total cost determined for each potential communication path is also dependent upon combined costs of coordination for the links of the respective potential communication path.

Conveniently the source node determines the total cost for each potential communications path as a sum of the combined costs for the links of the respective potential communication path.

The cost of interference for each link in the potential communication paths determined by the source node can also be dependent upon a time interval required for a signal sent via the respective link. For example, the source node can determine the cost of interference for each link in the potential communication paths as $\alpha * n_i * (t_i/T)$, where $\alpha$ is a weighting constant, $n_i$ is the number of nodes affected by a signal sent via the link, $t_i$ a time interval during which the signal is communicated, and T is a period of a transmission cycle.

The source node can determine the cost of transmission for each link in the potential communication paths as $\beta * (b_i/r_i)$, where $\beta$ is a weighting constant, $b_i$ is a number of bits to be transmitted, and $r_i$ is the data rate for a signal sent via the respective link.

The cost of coordination for each link in the potential communication paths determined by the source node can also be dependent upon a time interval required for coordinating activities. For example, the source node can determine the cost of coordination for each link as $\delta * n_c * (t_c/T) * (b_c/r_c)$, where $\delta$ is a weighting constant, $n_c$ is a number of nodes with which transmissions are coordinated, $t_c$ is a time interval required for coordinating activities, T is a period of a transmission cycle, $b_c$ is a number of bits to be transmitted in coordinating activities, and $r_c$ is a data rate for exchanging coordination information between nodes.

The invention also provides a node for a wireless network, the node providing wireless communication links for wireless communications with other nodes of the network and being operable in accordance with the method recited above, and further provides a wireless network comprising a plurality of such nodes.

BRIEF DESCRIPTION OF THE DRAWINGS

The invention will be further understood from the following description by way of example with reference to the accompanying drawings, in which.

DETAILED DESCRIPTION

Figure 1:
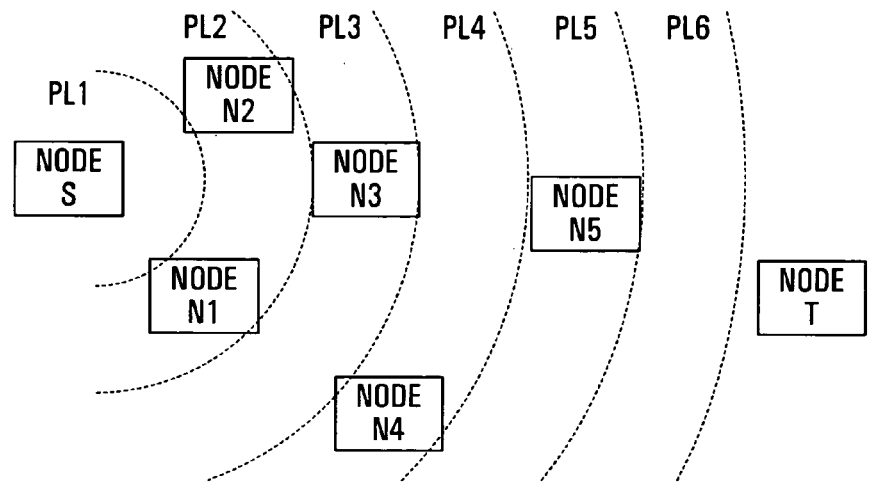
FIG. 1 diagrammatically illustrates distributed nodes of a wireless access network, using omnidirectional antennas, to which an embodiment of the invention can be applied.

Referring to the drawings, FIG. 1 illustrates parts of a wireless access network having distributed nodes which are assumed to use omnidirectional antennas for communications between nodes via wireless communication paths or transit links as described above. By way of example, FIG. 1 shows a source node S, a target node T, and other nodes N1 to N5 which are distributed within a geographical region or service area.

Preferably, this service area is a wireless access service area within which wireless terminals, not shown and which may have any of various forms, can communicate with the nodes to which they are closest thereby to communicate for example with other terminals within the service area or with a wired network (not shown) to which at least one of the nodes can be connected.

However, the invention is not limited to this application, and applies to any communications between nodes of a wireless network regardless of the sources and destinations of signals to be routed through the wireless network and regardless of how theses signals are supplied to and delivered from the nodes. Further, for convenience in the following description the signals are assumed to comprise packet data signals, but this need not be the case and other types of wireless signals could also, or instead, be routed through the wireless network.

In FIG. 1, it is assumed that a packet data signal is to be transmitted from the source node S to the target node T as a destination node, and the invention is concerned with the source node S determining an optimum routing, which may be via one or more of the other nodes N1 to N5, for this signal. It will be appreciated that although FIG. 1 is concerned only with this one signal, other signals may be being simultaneously sent between any of the nodes. Thus the wireless network has a respective source node and destination node at each instant for each packet data signal (and for each hop of a signal communicated via one or more intermediate nodes) within the network.

In FIG. 1, the nodes have omnidirectional antennas providing, for transmission from the source node S, a range of transmission according to the signal transmission power level, as represented in FIG. 1 by a respective dashed-line arc for power levels PL1 to PL6, each power level being associated with a respective data rate or signal bandwidth. Typically the power levels increase, and the associated data rates decrease, with increasing transmission range. For simplicity this description assumes line-of-sight transmission and ignores effects of multi-path transmission, clutter, temporal fading, etc.; such effects can also be taken into account in practical applications of embodiments of the invention.

For example, as shown in FIG. 1 a signal transmitted from the source node S with the power level PL2, providing an associated data rate DR2, can reach the nodes N1 and N2 but not the more distant nodes N3 to N5 and T; node N3 (as well as the closer nodes N1 and N2) can be reached by transmitting from the source node S with a power level PL3 providing an associated data rate DR3; node N4 and closer nodes can be reached by transmitting from the source node S with a power level PL4 providing an associated data rate DR4, and so on.

It can be appreciated that, in the omnidirectional antenna arrangement of FIG. 1, transmitting at any power level will cause interference for all nodes which can be reached at this power level or at a lower power level. For example, transmitting from the source node S to the node N3 at the power level PL3 causes interference for the closer nodes N1 and N2. Interference can be reduced by using successive short hops for signal transmission from the source node S to the target node T—for example a first hop can be from the source node S to the node N1 or the node N2 at the power level PL2—but this results in many signal hops and consequently increased packet delay in reaching the target node T.

Figure 2:
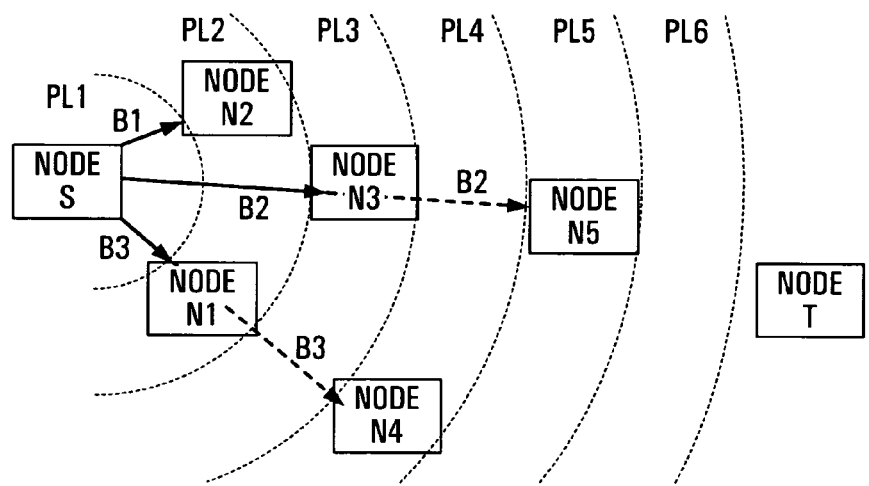
FIG. 2 diagrammatically illustrates distributed nodes of a wireless access network, using directed antenna beams, to which an embodiment of the invention can be applied.

The nodes can alternatively use directional antennas to transmit via different antenna beams in different directions, using either physically separate antennas or a beam-forming phased array. For example, FIG. 2 illustrates a wireless access network similar to that of FIG. 1 but in which the source node S uses antenna beams B1, B2, and B3 to transmit in the directions of nodes N2, N1, and N3 respectively. With the beam B1, the source node S can reach the node N2 using the power level PL1 without causing interference for any of the other nodes. Similarly, with the beam B2 the source node S can reach the node N3 using the power level PL3, and with the beam B3 the source node S can reach the node N1 using the power level PL2, in each case without causing interference for any of the other nodes.

The source node S can also reach the node N5 using the beam 32 with the power level PL5 as shown by a dashed line in FIG. 2, but this will also cause interference for the node N3. Similarly, the source node S can also reach the node N4 using the beam B3 with the power level PL4 as shown by a dashed line in FIG. 2, but this will also cause interference for the node N1. It will be appreciated that in each case this intra-system interference only occurs during the actual packet data signal communication.

It can be seen that an optimum selection by the source node S for a signal route to the target node T in the wireless access network of FIG. 2 is relatively more complicated than in the network of FIG. 1. As is further described by way of example below, path selection using techniques known for wired networks can produce inferior results in a wireless network, in particular in view of the intra-system interference in a wireless network.

Figure 3:
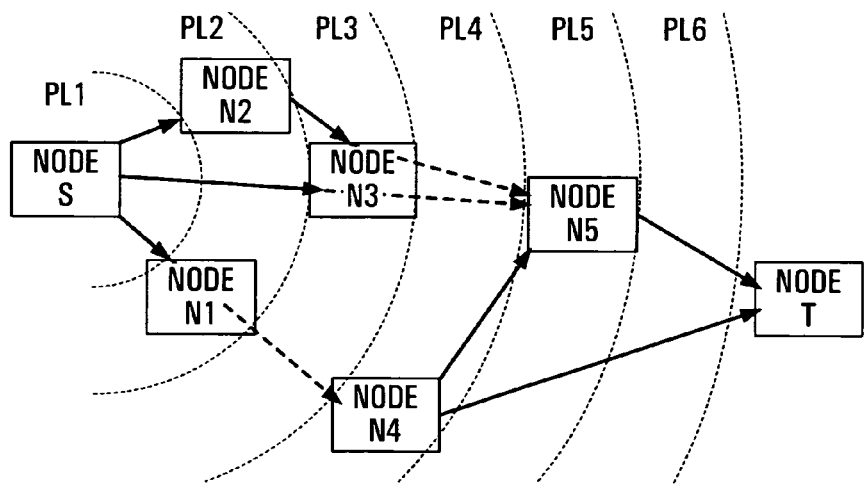
FIG. 3 illustrates the wireless access network of FIG. 2 with an example of wireless communication paths through the network.

This is illustrated, and an embodiment of the invention is described in detail, with reference to a specific example as illustrated in FIG. 3, which illustrates the wireless access network of FIG. 2 with possible paths through the network from the source node S to the target node T. More particularly, in FIG. 3 there are 8 potential paths or routes, identified as paths a to h below by the nodes which these paths or routes traverse:

path a: nodes S, N1, N4, T
path b: nodes S, N1, N4, N5, T
path c: nodes S, N4, T
path d: nodes S, N4, N5, T
path e: nodes S, N3, N5, T
path f: nodes S, N5, T
path g: nodes S, N2, N3, N5, T
path h: nodes S, N2, N5, T For example, the path a involves packet transmission in 3 hops or links, namely a first link from the source node S to the node N1, a second link from the node N1 to the node N4, and a third link from the node N4 to the target node T.

In order to select an optimum one of the potential paths, in an embodiment of the invention the source node S calculates a link transmission cost for each of the links in the potential paths, sums the respective ones of these to produce a total cost for each path, and selects as an optimum path the path having the least total cost.

In this embodiment, the link transmission cost for each link is determined by the source node S as being a sum of three components, which are determined in accordance with parameters for example as described below. These components are referred to as a cost of interference, Cx, a cost of transmission, Ct, and a cost of coordination, Cc, the total cost Ci for a link i being given by Ci=Cx+Ct+Cc. Each of the component costs can be determined as a function of various-parameters, and different functions can be used to suit particular situations.

The cost of interference, Cx, is a function f( ) of the number ni of nodes which are affected by a signal sent via the link i at power level PLi (i.e. the intended receiving node plus any nodes interfered with), and a time interval ti during which the signal is communicated, thus Cx=f(ni, ti). While various other functions can be used, one example of this cost function is Cx=α*ni*(ti/T), where α is a constant used to weight the cost of interference and T is the period of a transmission cycle (i.e. T=Σti). The cost of interference Cx can be ignored by choosing α=0.

The cost of transmission, Ct, is a function g( ) of the (maximum) data rate ri achievable at the power level PLi needed to send data via the link i, and the total amount of data, e.g. the number bi of bits, to be transmitted, this amount including both the initial packet transmission and any retransmissions required to overcome link errors. Thus Ct=g(ri, bi). While various other functions can be used, one example of this cost function is Ct=β*(bi/ri), where β is a constant used to weight the cost of transmission. The cost of transmission Ct can be ignored by choosing β=0.

The cost of coordination, Cc, is a function h( ) of the number nc of nodes with which a node must coordinate transmissions, a time interval tc that the node requires for coordinating activities, a total number bc of bits to be transmitted in coordinating activities, including both initial packet transmission and any retransmissions required to overcome link errors, and a (maximum) data rate rc at which control packets can be exchanged between nodes. Thus Cc=h(nc, tc, bc, rc). While various other functions can be used, one example of this cost function is Cc=δ*nc*(tc/T) *(bc/rc), where δ is a constant used to weight the cost of coordination. The cost of coordination Cc can be ignored by choosing δ=0.

The source node S is made aware of the existence of its neighbouring nodes (nodes N1 to N5 and the target node T as shown in the drawings), either by pre-programming or other means incidental to set-up of the wireless network or, more desirably, by a discovery or rediscovery process which can be carried out on initialization of the node. From related information, the source node S establishes a set of link cost parameters which it uses to determine the respective link cost components in accordance with the functions for example as described above.

In one example along the lines of the wireless network of FIG. 3, these link cost parameters determined by the source node S may be as shown by the following table:

|      | To      |        |        |        |        |       |
|------|---------|--------|--------|--------|--------|-------|
| From | N1      | N2     | N3     | N4     | N5     | T     |
| S    | (48,1)  | (36,1) | (24,1) | (54,2) | (18,3) | (0,0) |
| N1   | —       | (24,3) | (18,1) | (48,1) | (12,2) | (0,0) |
| N2   | —       | —      | (54,1) | (0,0)  | (24,2) | (0,0) |
| N3   | —       | —      | —      | (18,2) | (36,1) | (0,0) |
| N4   | —       | —      | —      | —      | (18,1) | (6,1) |
| N5   | —       | —      | —      | —      | —      | (18,1)|

In this table, the parameters are in the form (DR,n) where DR is the maximum data rate in Mb/s between the respective nodes (it is assumed here for simplicity that this is the same for both directions of transmission between the nodes, but this need not be the case) and n is the number of nodes receiving a signal transmitted between the nodes, i.e. the node intended to receive the signal and (n-1) nodes affected by the signal as interference. The data rates in this example are from the IEEE 802.11a specification; the wireless communications on the transit links between the nodes may conveniently be in accordance with this standard.

It is assumed in this example that α and β are both 1, and that δ=0, i.e. the cost of coordination is assumed to be zero. Further, it is assumed that the interference cost function Cx=f(ni, ti)=α*ni*(ti/T) is used with ti=T, so that Cx=ni, and that the transmission cost function is Ct=g(ri, 1)=β/ri=1/ri. The relative link costs determined from the table above in accordance with these functions are given by the following table (asterisks in this table are referred to later below):

|      | To     |       |        |       |        |     |
|------|--------|-------|--------|-------|--------|-----|
| From | N1     | N2    | N3     | N4    | N5     | T   |
| S    | 1.021* | 1.028 | 1.042  | 2.019 | 3.056  | ∞   |
| N1   | —      | 3.042 | 1.056  | 1.021*| 2.083  | ∞   |
| N2   | —      | —     | 1.019* | ∞     | 2.028  | ∞   |
| N3   | —      | —     | —      | 2.056 | 1.028* | ∞   |
| N4   | —      | —     | —      | —     | 1.056* | 1.167 |
| N5   | —      | —     | —      | —     | —      | 1.056* |

The total cost of each of the 8 potential paths a to h is then determined by the source node S as the sum of the link costs for the individual links for each path, thus:

path a: Cost{S, N1, N4, T}=3.208
path b: Cost{S, N1, N4, N5, T}=4.153
path c: Cost{S, N4, T}=3.185
path d: Cost{S, N4, N5, T}=4.130
path e: Cost{S, N3, N5, T}=3.125
path f: Cost{S, N5, T}=4.111
path g: Cost{S, N2, N3, N5, T}=4.130
path h: Cost{S, N2, N5, T}=4.125

From this the least cost path, path e comprising the nodes S-N3-N5-T, is selected by the source node S as the preferred path or route.

The determinations in the source node S for example as described above can be carried out in any desired manner, for example using processing means which may be in the form of a general purpose processor, a digital signal processor, or an application-specific integrated circuit, associated with appropriate memory for storing, among other things, data relating to neighbouring nodes in the wireless network and overhead data parameters associated with the interference, transmission, and coordination costs described above.

Advantages of the path selection method of an embodiment of the invention as described above can be seen clearly by comparison with the relatively inferior results which would be produced by using routing or path selection procedures that are known for wired networks.

In a known "shortest path" procedure, a path having the smallest number of links or hops is selected to be the preferred path. In the network of FIG. 3, this would be path c (nodes S, N4, T) or path f (nodes S, N5, T), neither of which is the least cost path because in the wireless network these paths produce interference for the intervening nodes N1 and N3 respectively.

In a known "least transmission cost path" procedure, a path having the lowest transmission cost is selected to be the preferred path. This corresponds to also making α=0 in the determinations described above, ignoring the effects of interference, and results in selecting path f (nodes S, N5, T) as the preferred path. As seen above, this is not the least cost path for the wireless network.

In a known "least transmission cost links" procedure, each node independently chooses the outgoing link that has the lowest cost. For each of the nodes S and N1 to N5, these lowest cost links are indicated by asterisks in the second table above. This procedure would result in the path b (nodes S, N1, N4, N5, T) as the preferred path, whereas the method of an embodiment the invention as described above represents this as the highest cost path for the wireless network.

In a known "nearest neighbours" procedure, each node independently chooses the outgoing link to its nearest neighbour, regardless of cost. This procedure would result in the path g (nodes S, N2, N3, N5, T) as the preferred path, whereas the method of an embodiment of the invention as described above represents this as a second-highest cost path for the wireless network.

Consequently, it can be seen that the method of an embodiment of the invention as described above provides better selection of a preferred path having lowest cost in a wireless network than procedures known for wired networks, which fail to take into account the interference effects which occur in a wireless network but not in a wired network.

Although the invention has been described by way of example in the context of a particular type of wireless network and with respect to particular cost functions, parameters, and configurations, it can be appreciated that these may all be varied and that the invention is applicable to path selection in wireless networks generally. In addition, the invention can be applied regardless of the particular type of wireless network and its application. For example, the invention is applicable to CDMA-, TDMA-, GSM-, GSM/EDGE-, UMTS-, and IEEE §802-compliant networks, and can be employed in local, community, and wide area networks, and to any type of wireless network generally.

Thus although a particular embodiment of the invention and variations are described above, it can be appreciated that these are given only by way of example and illustration, and that numerous modifications, variations, and adaptations may be made within the scope of the invention as defined in the claims.

The invention claimed is:

1. A method of selecting a communication path, in a wireless network comprising a plurality of nodes and wireless communication links between the nodes, from a plurality of potential communication paths comprising different combinations of said links from a source node to a target node, comprising the steps of, in the source node:
   determining for each link in the potential communication paths a cost of interference dependent upon a number of nodes affected by a signal sent via the respective link;
   determining a total cost for each potential communication path, the total cost being dependent upon combined costs of interference for the links of the respective potential communication path; and
   selecting as a communication path from the source node to the target node a potential communication path having a lowest total cost.

2. A method as claimed in claim 1 and including the step of, in the source node, determining for each link in the potential communication paths a cost of transmission dependent upon a data rate for a signal sent via the respective link, wherein the total cost determined for each potential communication path is also dependent upon combined costs of transmission for the links of the respective potential communication path.

3. A method as claimed in claim 2 and including the step of, in the source node, determining for each link in the potential communication paths a cost of coordination of transmissions on the link with transmissions from other nodes of the network, wherein the total cost determined for each potential communication path is also dependent upon combined costs of coordination for the links of the respective potential communication path.

4. A method as claimed in claim 2 wherein the source node determines the total cost for each potential communications path as a sum of the combined costs for the links of the respective potential communication path.

5. A method as claimed in claim 2 wherein the cost of interference for each link in the potential communication paths determined by the source node is also dependent upon a time interval required for a signal sent via the respective link.

6. A node for a wireless network, the node providing wireless communication links for wireless communications with other nodes of the network and being operable in accordance with the method of claim 2.

7. A wireless network comprising a plurality of nodes each as claimed in claim 6.

8. A method as claimed in claim 1 and including the step of, in the source node, determining for each link in the potential communication paths a cost of coordination of transmissions on the link with transmissions from other nodes of the network, wherein the total cost determined for each potential communication path is also dependent upon combined costs of coordination for the links of the respective potential communication path.

9. A method as claimed in claim 8 wherein the source node determines the total cost for each potential communications path as a sum of the combined costs for the links of the respective potential communication path.

10. A method as claimed in claim 8 wherein the cost of interference for each link in the potential communication paths determined by the source node is also dependent upon a time interval required for a signal sent via the respective link.

11. A method as claimed in claim 8 wherein the cost of coordination for each link in the potential communication paths determined by the source node is also dependent upon a time interval required for coordinating activities.

12. A node for a wireless network, the node providing wireless communication links for wireless communications with other nodes of the network and being operable in accordance with the method of claim 8.

13. A wireless network comprising a plurality of nodes each as claimed in claim 12.

14. A method as claimed in claim 1 wherein the source node determines the total cost for each potential communications path as a sum of the combined costs for the links of the respective potential communication path.

15. A node for a wireless network, the node providing wireless communication links for wireless communications with other nodes of the network and being operable in accordance with the method of claim 14.

16. A wireless network comprising a plurality of nodes each as claimed in claim 15.

17. A method as claimed in claim 1 wherein the cost of interference for each link in the potential communication paths determined by the source node is also dependent upon a time interval required for a signal sent via the respective link.

18. A node for a wireless network, the node providing wireless communication links for wireless communications with other nodes of the network and being operable in accordance with the method of claim 17.

19. A node for a wireless network, the node providing wireless communication links for wireless communications with other nodes of the network and being operable in accordance with the method of claim 1.

20. A wireless network comprising a plurality of nodes each as claimed in claim 19.

* * * * *